United States Patent
Mann et al.

(10) Patent No.: US 12,406,331 B2
(45) Date of Patent: Sep. 2, 2025

(54) ACCOMMODATING DISSIMILAR CAMERAS ON A COMMON SCANNING GIMBAL—STAGGER-STEP SCANNING

(71) Applicant: RAYTHEON COMPANY, Waltham, MA (US)

(72) Inventors: David Christopher Mann, Frisco, TX (US); Randall W. Zywicki, McKinney, TX (US)

(73) Assignee: Raytheon Company, Arlington, VA (US)

( * ) Notice: Subject to any disclaimer, the term of this patent is extended or adjusted under 35 U.S.C. 154(b) by 550 days.

(21) Appl. No.: 17/752,962

(22) Filed: May 25, 2022

(65) Prior Publication Data

US 2023/0385999 A1 Nov. 30, 2023

(51) Int. Cl.
*G06T 5/50* (2006.01)
*G01J 3/28* (2006.01)

(52) U.S. Cl.
CPC .............. *G06T 5/50* (2013.01); *G01J 3/2823* (2013.01); *G06T 2207/10036* (2013.01)

(58) Field of Classification Search
CPC ............. G06T 5/50; G06T 2207/10036; G01J 3/2823; G01J 3/0248; G01J 3/06; G01J 3/36; G01J 5/047; G01J 5/0859
See application file for complete search history.

(56) References Cited

U.S. PATENT DOCUMENTS

| | | | | |
|---|---|---|---|---|
| 5,436,717 A | * | 7/1995 | Ogino | G01N 15/1404 356/73 |
| 2012/0200700 A1 | * | 8/2012 | Bennett | G01S 17/04 348/143 |
| 2019/0073536 A1 | * | 3/2019 | Jha | H04N 25/76 |
| 2022/0221102 A1 | * | 7/2022 | Yang | G03B 17/561 |
| 2023/0300433 A1 | * | 9/2023 | Yoon | H04N 23/13 348/262 |
| 2023/0367014 A1 | * | 11/2023 | Nestinger | G01S 7/4817 |

* cited by examiner

*Primary Examiner* — Mariam Qureshi
(74) *Attorney, Agent, or Firm* — Schwegman Lundberg & Woessner, P.A.

(57) ABSTRACT

Optical imaging apparatus and method of operating the same, where the apparatus includes optics configured to provide a first optical channel and a second optical channel through the optics, a two-dimensional image sensor optically coupled to the optics, the two-dimensional image sensor configured to receive a first optical signal from the first optical channel and provide a two-dimensional image, a one-dimensional image sensor assembly optically coupled to the optics and sharing a same line of sight, the one-dimensional image sensor assembly configured to receive a second optical signal from the second optical channel at a one-dimensional image sensor therein to provide an image with an overlapping coverage area in the two-dimensional image, and at least one processor configured to operate the two-dimensional image sensor and the one-dimensional image sensor assembly.

18 Claims, 5 Drawing Sheets

ACCOMMODATING DISSIMILAR CAMERAS ON A COMMON SCANNING GIMBAL—STAGGER-STEP SCANNING

FIELD

Embodiments generally relate to scanning systems and methods that utilize two-dimensional and one-dimensional imaging sensors.

BACKGROUND

Electro-optical/infrared (EO/IR) cameras and imaging systems are used in military and law enforcement applications to provide increased situational awareness by including both visible and infrared sensors to thereby image an environment in day, night, and low light conditions. EO/IR cameras and systems exhibit a high coverage rate at the expense of imaging range, leaving some targets unable to be imaged due to their distance from the EO/IR cameras.

Hyperspectral imaging (HSI) cameras and imaging systems collect both spectral and spatial information. One goal of HSI imaging is to obtain spectra for each pixel in a one-dimensional image with the intent of finding objects or identifying materials, for example. While HSI imaging systems may have longer range compared to EO/IR imaging systems, the gains in range are made at the expense of coverage rate and field of view.

Imaging systems that incorporate a variety of dissimilar imaging sensors into a common platform can be costly and require additional constraints and considerations beyond that of their single sensor imaging system counterparts. A prior solution to incorporating multiple types of imaging sensors without sensor interference is to have a separate optical channel or line of sight for each sensor to provide incoming light to each respective sensor from a separate lens or other input optic. However, certain applications add a further constraint/requirement of all the imaging sensors needing to receive light through a common telescope or optical channel, which may lead to interference between the sensors and/or optical channels.

SUMMARY

Systems and methods for scanning a target scene with a payload containing 2-D EO/IR and 1-D HSI sensors that share a common line of sight are provided. Embodiments accordingly utilize a Stagger-Step Scan (SSS) method to increase the HSI search area/coverage rate without sacrificing the coverage rate of the EO/IR imaging or otherwise interfering with the EO/IR imaging.

At least one embodiment is directed to an optical imaging apparatus comprising optics configured to provide a first optical channel and a second optical channel through the optics, a two-dimensional image sensor optically coupled to the optics, the two-dimensional image sensor configured to receive a first optical signal from the first optical channel and provide a two-dimensional image of a scene, a one-dimensional image sensor assembly optically coupled to the optics and sharing a same line of sight, the one-dimensional image sensor assembly configured to receive a second optical signal from the second optical channel at a one-dimensional image sensor therein to provide an image with an overlapping coverage area of the scene in the two-dimensional image, and at least one processor configured to operate the two-dimensional image sensor and the one-dimensional image sensor assembly.

In one example, the apparatus further comprises a gimbal assembly configured to step the two-dimensional image and the image in azimuth through a plurality of steps. The two-dimensional image sensor and the one-dimensional image sensor may be configured to backscan in azimuth for a last step of the plurality of steps.

In another example, the one-dimensional image sensor assembly includes a scanning mirror configured to move the image in an elevation direction to provide scans in elevation of the image responsive to the one-dimensional image sensor assembly receiving a control signal from the at least one processor. The two-dimensional image sensor may have a first field of view, the one-dimensional image sensor has a second field of view that is an integer multiple N of the first field of view in the azimuth direction. The controller may be configured to move the scanning mirror by a predetermined angle N times in the elevation direction to produce, for each of the N times, the image that overlaps with the coverage area of the scene of the two-dimensional image. The controller may be configured to reset the scanning mirror to a first elevation step after every N steps in elevation.

In one example, the apparatus further comprises an image motion compensator configured to stabilize the images provided by the two-dimensional and one-dimensional image sensors. The image motion compensator may be an image compensation mirror.

In another example, the two-dimensional image sensor is an electro-optical/infrared camera sensor.

In one example, the one-dimensional image sensor is a hyperspectral imaging sensor.

In another example, the optics include an afocal telescope.

In one example, the apparatus further comprises a beam splitter configured to provide the first optical channel to the two-dimensional image sensor and provide the second optical channel to the one-dimensional image sensor assembly. The beam splitter may be a dichroic mirror.

In another example, the two-dimensional image sensor is further configured to provide a plurality of two-dimensional images including the two-dimensional image of the scene, and the at least one processor is further configured to stitch each of the plurality of two-dimensional images together.

In one example, the image includes a plurality of images, and the at least one processor is further configured to stitch each of the plurality of images together.

In another example, the first optical signal has a first wavelength range and the second optical signal has a second wavelength range that excludes the first wavelength range.

At least one embodiment is directed to a method of optical imaging, comprising providing a first optical channel and a second optical channel sharing a same line of sight through optics, receiving a first optical signal from the first optical channel from a two-dimensional sensor, providing a two-dimensional image of a scene from the first optical signal, receiving a second optical signal from the second optical channel from a scanned one-dimensional sensor having an overlapping coverage area of the scene of the two-dimensional image sensor, and providing an image from the second optical signal provided from the scanned one-dimensional image sensor.

In one example, the method further comprises moving the two-dimensional image and the image in azimuth through a plurality of steps in azimuth. The method may further comprise backscanning the two-dimensional image and the image in azimuth for a last step of the plurality of steps.

In another example, the method further comprises moving the image in an elevation direction to provide scans in elevation of the image responsive to receiving a control signal. The method may further comprise providing the two-dimensional image sensor with a first field of view and providing the one-dimensional image sensor with a second field of view that is an integer multiple N of the first field of view in the azimuth direction. The method may further comprise moving the image by a predetermined angle N times in the elevation direction to produce, for each of the N times, the image that overlaps with the coverage area of the scene of the two-dimensional image. The method may further comprise resetting the one-dimensional image to a first elevation step after every N steps in elevation.

In one example, the method further comprises stabilizing the images provided by the two-dimensional and one-dimensional image sensors In another example, the method further comprises providing the first optical channel with the two-dimensional image sensor and providing the second optical channel with the one-dimensional image sensor.

In one example, providing a two-dimensional image of a scene from a two-dimensional image sensor includes providing a plurality of two-dimensional images including the two-dimensional image of the scene and stitching each of the plurality of two-dimensional images together.

In another example, providing the image includes providing a plurality of images, and the method further comprises stitching each of the plurality of images together.

In one example, the first optical signal has a first wavelength range and the second optical signal has a second wavelength range that excludes the first wavelength range.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and examples, and are incorporated in and constitute a part of this specification, but are not intended as a definition of the limits of a particular example. The drawings, together with the remainder of the specification, serve to explain principles and operations of the described and claimed aspects and examples. In the figures, each identical or nearly identical component that is illustrated in various figures is represented by a like numeral. For purposes of clarity, not every component may be labeled in every figure. In the figures:

DETAILED DESCRIPTION

Multi-sensor imaging systems with dissimilar image sensors therein typically use separate optical channels for each image sensor. As discussed above, while EO/IR sensors and HSI sensors have their respective strengths and weaknesses, constructing an imaging system including both of such sensors with the constraint of the two sensors having to share a common telescope or optical channel (bound to the same scan) is challenging for a variety of reasons including a limited coverage area of the HSI sensor.

Embodiments described herein increase the coverage area/field of view (FOV) of a 1-D HSI sensor without interfering with the 2-D imaging/framing sensor. In an exemplary application, optical imaging systems described herein are implemented as gimbaled turrets attached to a moving vehicle (e.g., a helicopter). To increase the vertical field of view of the HSI sensor, a slit of the HSI sensor is oriented horizontally in object space and scanned vertically or in elevation as the gimbal sweeps across the target scene. The slit of the HSI sensor is, in certain instances, an integer multiple of the horizontal field of view of the 2-D imaging sensor. In certain examples, a backscan mirror stabilizes the lines of sight of the framing and HSI sensors as the gimbal scans at a constant rate. The HSI sensor scans vertically while the backscan mirror stabilizes the line of sight of both sensors. The gimbal then continues to move the line of sight ahead for the next frame (i.e., gimbal position in azimuth). In an example, the HSI FOV is three times wider than that of the framing camera, though other embodiments include different integer multiples other than three. Accordingly, the HSI vertical scan only needs to reset every three frames when the integer multiple is three, every two frames when the integer multiple is two, and so on. Therefore, the vertical coverage of the HSI sensor is increased by a factor of the integer multiple. This facilitates the HSI sensor being able to scan a sufficient range without interfering with the EO/IR sensor.

Figure 1:
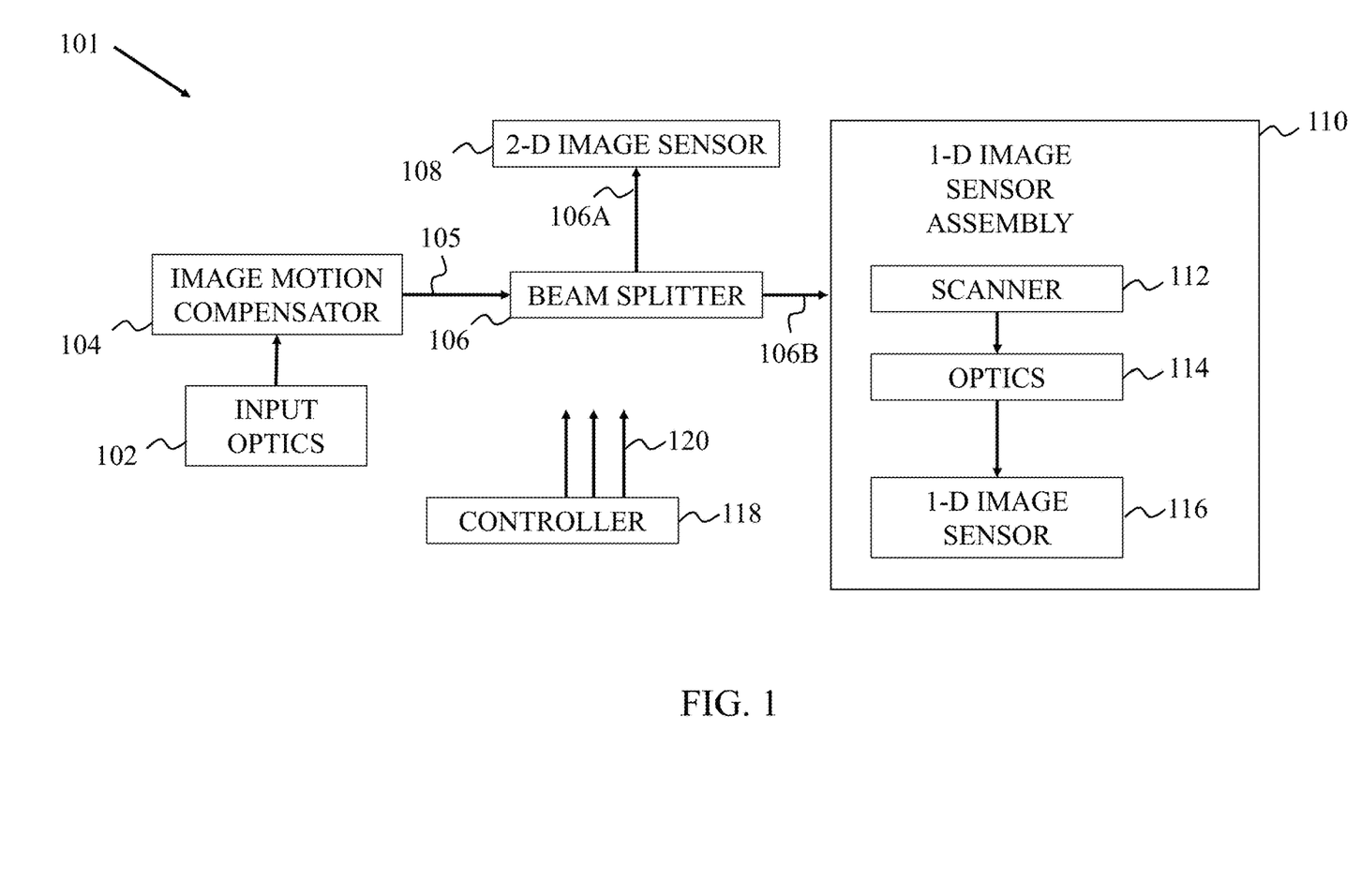
FIG. 1 illustrates an optical imaging system according to one embodiment of the present disclosure.

FIG. 1 illustrates a functional block diagram of an optical imaging apparatus generally indicated at 101. The optical imaging apparatus 101 is implemented in certain applications as a gimbaled turret. Due to the constraints of a platform like a gimbaled turret, such as limited size and weight, imaging sensors may be required to share a common line of sight. To maximize performance of dissimilar image sensors sharing such a common line of sight, the optical imaging apparatus 101 includes input optics 102, which provides incoming light from a target scene to an image motion compensator 104. In some examples, the image motion compensator 104 is part of a gimbal assembly. The gimbal assembly, in at least one example, includes each component of the optical imaging apparatus 101 such that the entire optical imaging apparatus 101 moves at a constant rate in azimuth. It is appreciated that the gimbal assembly can move at a non-constant rate. To move the optical imaging apparatus 101, in some examples, the gimbal assembly includes one or more motors or actuators that are controllable by one or more processors. The input optics 102, in certain examples includes an afocal telescope and the image motion compensator 104 includes a mirror. The motion-compensated light provided by the image motion compensator 104 is received by a beam splitter 106 along a shared optical path 105. The beam splitter 106 is, in at least one example, a dichroic mirror. A dichroic mirror is a mirror having significantly different reflection or transmission properties at two different wavelengths.

The beam splitter 106 provides light (i.e., an optical signal) along a first optical channel 106A towards a 2-D image sensor 108 and along a second optical channel 106B towards a 1-D sensor assembly 110. In at least one example, the beam splitter 106 is configured to pass visible and mid-wavelength infrared (MWIR) along the first optical channel 106A and pass long-wavelength infrared (LWIR) along the second optical channel 106B.

The 1-D image sensor assembly includes a scanner 112, optics 114, and a 1-D image sensor 116. The scanner 112 receives light from the second optical channel 106B and actively re-directs the light received from the second optical channel 106B to the optics 114, which further directs the light onto the 1-D image sensor. A mechanically-actuated mirror is used as the scanner 112 according to certain embodiments, thereby providing a scanning mirror. As will be discussed in more detail below, the optical imaging apparatus 101 is configured to scan the input optics 102 along a particular direction, such as in the azimuth direction. Due to the relatively smaller field of view (FOV) of the 1-D image sensor 116 compared to the 2-D image sensor 108, the scanner 112 scans the 1-D image acquired by the 1-D image sensor 116 in elevation, thereby creating a 2-D image composed of sequential scans of the 1-D image in elevation. The 1-D image sensor 11 is an LWIR spectrometer in at least one example. The scanner 112, at least in certain embodiments, is controlled by one or more control signals 120 provided by a controller 118 that is included in the optical imaging apparatus 101. The controller 118 is a general-purpose processor. However, in other embodiments, the controller 118 is a custom-built processor. For example, instead of a generic or off-the-shelf processor, a custom Application-Specific Integrated Circuit is developed to optimize performance (e.g., power consumption, operations per second) for the optical imaging apparatus 101.

Figure 2:
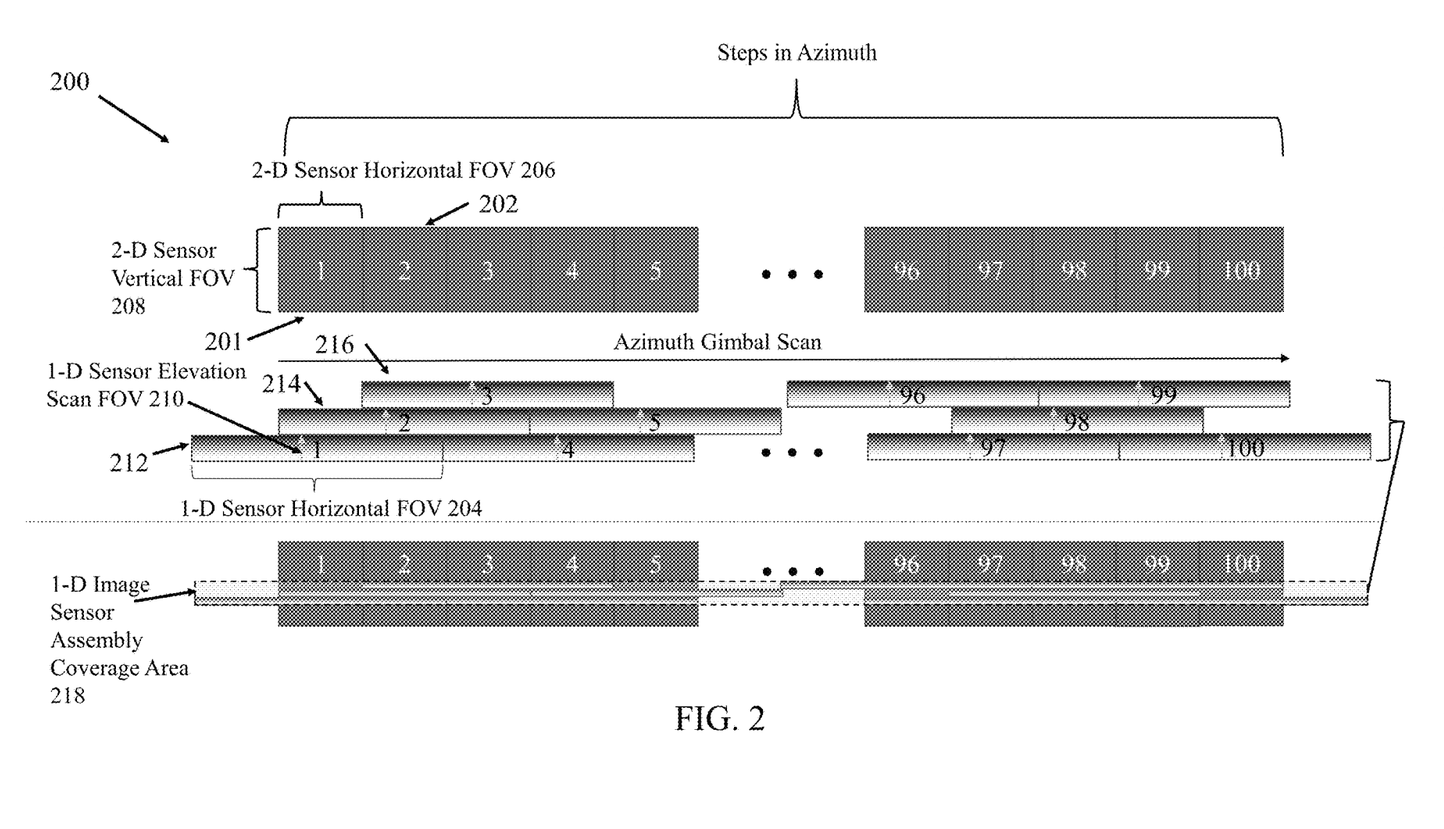
FIG. 2 illustrates a stagger-step scan method according to one embodiment of the present disclosure.

FIG. 2 illustrates a stagger-step scan (SSS) method generally indicated at 200. The SSS method 200 is utilized to simultaneously acquire 2-D and 1-D image data using the optical imaging apparatus 101. In a step and stare optical imaging apparatus as described herein (e.g., the optical imaging apparatus 101), the image motion compensator 104 is moved to 'stare' (i.e., not move) at the target area during exposure, acquire an optical signal, move to the next staring/gimbal position, and then return to the starting position after reaching a final staring position. The following description of the SSS method 200 is made in the context of applying the SSS method 200 with the optical imaging apparatus 101, though it is appreciated that the SSS method 200 is applicable to other comparable optical imaging systems and apparatuses.

The SSS method 200 begins at an initial/starting gimbal position 1 of the image motion compensator 104. While in the starting position 1, the 2-D image sensor 108 acquires a first optical signal from the first optical channel 106A of the optical imaging apparatus 101 to thereby form a 2-D image 201 of a scene. At the same time or substantially the same time, light from the target scene travels along the second optical channel 106B as a second optical signal to the 1-D image sensor 116. Due to the shared optical path 105, the light provided from the input optical 102 that is motion-compensated by the image motion compensator 104 provides a 1-D image with an overlapping coverage area 218 of the scene with the 2-D image.

The horizontal field of view 204 of the 1-D image sensor 116 is, in the example of FIG. 2, three times (N=3) the size of the horizontal field of view 206 of the 2-D image sensor 108. It is appreciated that N=3 is an example and other values of N (e.g., 2, 4, 5) are possible. The 1-D image sensor 116 creates an image that is a one-dimensional array or line of values. To increase the vertical field of view of the 1-D image sensor 116, the 1-D image sensor 116 is scanned vertically via the scanner 112 to thereby form a first 2-D image 212 having a vertical/elevation field of view 210. Each subsequent 2-D image generated by the scanner 112 has the same vertical field of view. While the 1-D image sensor 116 has a significantly larger horizontal field of view 204, the resulting elevation scan field of view 210 of the scanned 1-D image is significantly smaller than the vertical field of view of the 2-D image sensor 108.

Once the elevation scan of the 1-D image sensor 116 is complete, the image motion compensator 104 is moved in azimuth to the second gimbal position 2 where a second 2-D image 202 is acquired and the 1-D image sensor 116 is once again scanned in elevation. Notably, the overall vertical scanning range of the scanner 112 is divided amongst every N elevation scans of the 1-D image sensor 116. In other words, the scanner 112 does not reset to an initial elevation position for every elevation scan. After the first elevation scan is performed for the first gimbal position 1 to create the first 2-D image 212, the optical imaging apparatus 101 moves to the second gimbal position 2 and then the scanner 112 continues from the 'top' position of the first 2-D image 212 to form a second 2-D image 214 by scanning the 1-D image sensor 116 in elevation further by the same predetermined angle as the first 2-D image 212. This process is repeated for the third gimbal position 3 to form a third 2-D image 216. As shown in FIG. 2, the 1-D sensor elevation scans are staggered as the gimbal scan is stepped in azimuth. Upon completing the elevation scanning for the gimbal position 3 and acquiring the third 2-D image 216 at the gimbal position 3, the scanner 112 returns to its initial position in elevation, whereby the entire process repeats for the fourth gimbal position 4.

By scanning the 1-D image sensor 116 in the manner just described as the image motion compensator 104 moves from one azimuth position to the next, a contiguous 2-D image is formed from the one-hundred images acquired by the 2-D image sensor 108 and another overlapping contiguous image is formed as indicated by the 1-D image sensor assembly coverage area 218 shown in FIG. 2. To combine the individual 2-D images together and/or the image scans from the 1-D image sensor 116, image stitching algorithms known to those of skill in the art are utilized. It is also apparent from FIG. 2 why the number of elevation scans matches the number of 2-D images acquired from the 2-D image sensor 108 across the horizontal field of view of the 1-D image sensor 116. For example, if a fourth elevation scan was added beyond the upper limit of the third 2-D image 216 before resetting to the initial elevation position, there would not be enough time for the scanner 112 to return to the initial elevation position before the optical imaging apparatus 101 moved to gimbal position 5. This would cause a gap between the first 2-D image 212 and the fifth 2-D image produced from the 1-D sensor assembly 110.

While shown in FIG. 2 as partially overlapping with the 2-D images acquired by the 2-D image sensor 108, the 1-D image sensor assembly coverage area 218 in certain embodiments covers a different subset of the 2-D images or covers the entirety of the 2-D images acquired by the 2-D image sensor 108. The particular amount of coverage depends, at least in part by the optics 114 in the 1-D image sensor assembly and/or other optics within the optical imaging apparatus 101. What is not shown in FIG. 2 is, in the example of the optical imaging apparatus 101 being attached to a moving aircraft (e.g., helicopter) and the forward motion of the aircraft. The first three scans of the 1-D image sensor 108 including the first 2-D image 212, the second 2-D image 214, and the third 2-D image 216, as well as the remaining 2-D images formed by the 1-D image sensor 108 are formed while the optical imaging apparatus 101 is in motion (e.g., the helicopter flying forward over the ground). Depending on the particular velocity or acceleration of the motion, the rate at which the scanner 112 and image motion compensator 104 operate may be adjusted.

Figure 3:
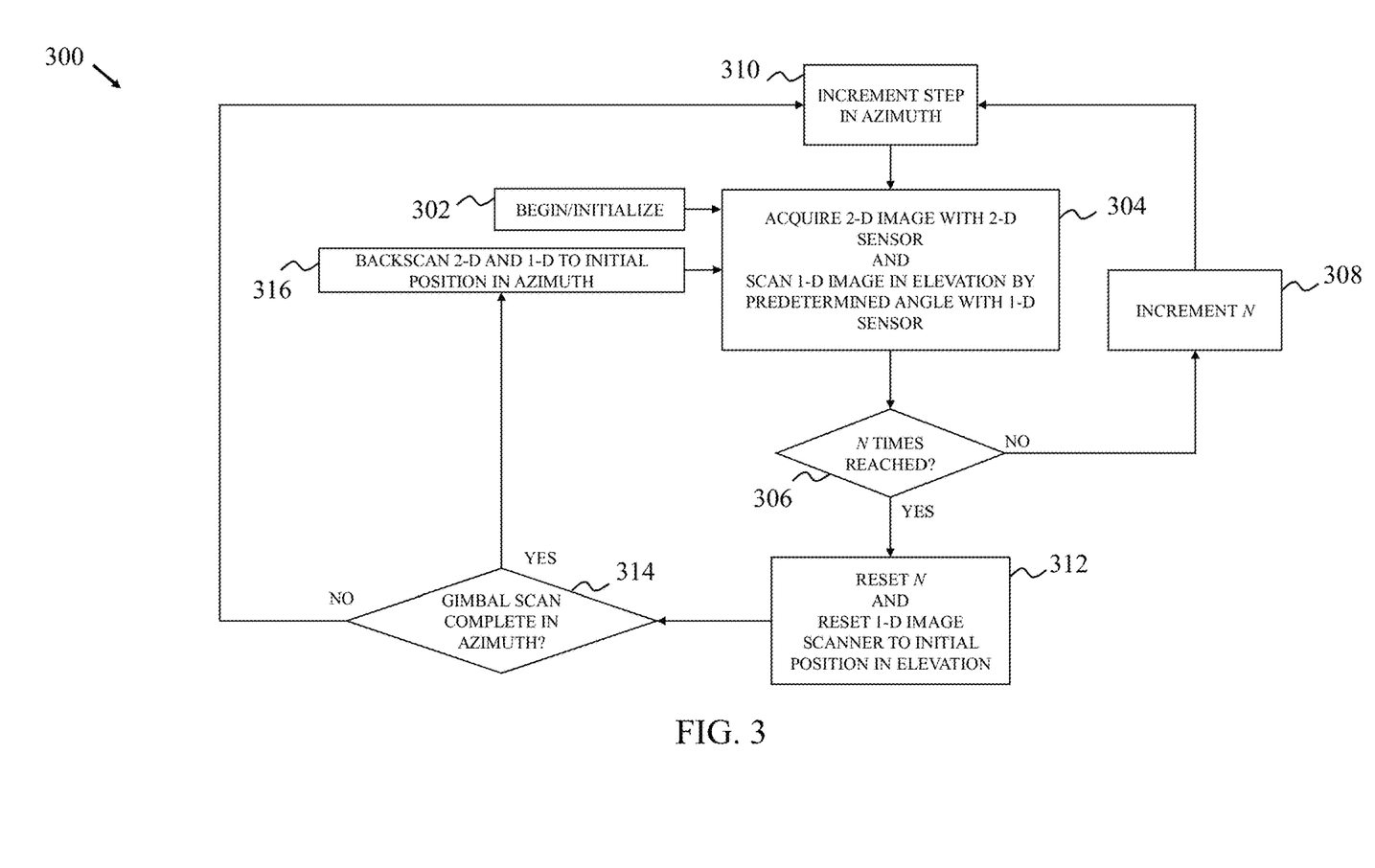
FIG. 3 is a flowchart of a stagger-step scan method according to one embodiment of the present disclosure.

FIG. 3 illustrates a stagger-step scan (SSS) method 300 as a functional block diagram that is a generalized method of the SSS method 200. Discussion of the SSS method 300 is considered applicable to the SSS method 200, and vice versa, unless indicated otherwise. The SSS method 300 begins at a first step 302. As part of the initialization of the SSS method 300 a counter is set. For example, the integer N (i.e., the number of vertical scans before resetting to the initial elevation position) is initialized to a value of one. The first step 302 of the SSS method 300 may include resetting the image motion compensator 104 to an initial position in azimuth and the scanner 112 to an initial position in elevation. Following initialization, and using the optical imaging apparatus 101 for context, the SSS method 300 proceeds to step 304 where the 2-D image sensor 108 and the 1-D image sensor 116 simultaneously receive optical signals from the beam splitter 106. During the step 304, the 1-D image sensor 116 is scanned in elevation by the scanner 112 by a predetermined angle. In at least some embodiments, included in the step 304 is a storage operation whereby the scanned images from the 1-D image sensor 116 and the 2-D images acquired by the 2-D image sensor 108 are at least temporarily stored in a storage or memory for stitching together with images acquired in subsequent steps.

Following the step 304, the SSS method 300 proceeds to the condition 306 whereby the current value of N is compared to a threshold. In the example of the SSS method 200 shown in FIG. 2, the threshold is three. Since N at this point is equal to one, the SSS method 300 proceeds to the step 308 where N is incremented by one. In this case, adding one to N is two. After N is incremented in the step 308, the current gimbal position is incremented as well. It is appreciated that the steps 308, 310 can occur simultaneously or be performed in the opposite order as presented in FIG. 3. After the position of the image motion compensator 104 is stepped/incremented in azimuth (gimbal position 2 in this case), the step 304 is repeated for a second time where the 1-D image acquired by the 1-D image sensor 116 is scanned again picking up from where the first scan left off in elevation. Again at the condition 306, N is not equal to three, so the SSS method 300 proceeds again to the step 308 whereby N becomes equal to three and then in step 310 the image motion compensator 104 is stepped in azimuth to gimbal position 3. Upon reaching the condition 306, since the step 304 has been reached three times (N=three), the SSS method 300 proceeds to the step 312.

To prepare the scanner 112 for the next gimbal position, N is reset to one and the scanner 112 is reset to its initial position in elevation at the step 312. All or part of the SSS methods 200, 300 are implemented via the control signals 120 provided by the controller 118. In some instances, the controller 118 is a processor. Accordingly, the controller 118 increments the count for N, controls the scanner 112 to change position in elevation, acquires the image data in the step 304, and so forth.

Following the step 312, the condition 314 is processed in the SSS method 300. The condition 314 compares the current gimbal position to a position threshold. For example, when implementing the one-hundred steps in azimuth shown in FIG. 2, at this stage of the SSS method 300, three out of the one-hundred steps have been completed. The position threshold is thus one-hundred. Since three is not equal to or greater than one-hundred, the condition 314 indicates 'NO' and the SSS method 300 proceeds to the step 310 where the image motion compensator 104 is moved in azimuth to the gimbal position 4. Once the condition 314 indicates that all one-hundred gimbal positions have been reached, the condition 314 indicates 'YES' and the SSS method 300 proceeds to the step 316 where the gimbal assembly is reset to gimbal position 1. Additionally in the step 316, a counter for tracking the current gimbal position is reset to 1.

While two examples of methods for operating the optical imaging apparatus 101 are described above, it is appreciated that other variations of these methods are also possible. For example, instead of resetting to the first gimbal position 1 in the step 316, a different gimbal position can be specified. In another example, the threshold that is compared in the condition 314 can be changed to a different position than gimbal position 100. In a scenario where a specific subset of the range of gimbal positions is desire to be scanned, then the starting and ending gimbal positions can be specified so that, for example, instead of stepping through positions 1 through 100, the image motion compensator 104 can be limited to a range between gimbal positions 20 and 80.

Additional embodiments include the optical imaging apparatus attached to a ground-based vehicle. While embodiments of the number of 1-D scans performed before resetting the scanner 112 to its initial elevation position is preferably at least two, it is appreciated that the degenerative case (N=1) of the 1-D sensor 116 and the 2-D image sensor 108 being matched (i.e., no scanner) is possible. While the scanning rate may be slower compared to more than one elevation scan being performed, such a degenerative case would afford the benefit of lower cost due to the lack of need for a scanner to change the elevation of the 1-D image sensor.

Processes and methods associated with various embodiments, acts thereof and various embodiments and variations of these methods and acts, individually or in combination, may be defined by computer-readable signals tangibly embodied on a computer-readable medium, for example, a non-volatile recording medium, an integrated circuit memory element, or a combination thereof. According to one embodiment, the computer-readable medium may be non-transitory in that the computer-executable instructions may be stored permanently or semi-permanently on the medium. Such signals may define instructions, for example, as part of one or more programs, that, as a result of being executed by a computer, instruct the computer to perform one or more of the methods or acts described herein, and/or various embodiments, variations and combinations thereof. Such instructions may be written in any of a plurality of programming languages, for example, Java, Visual Basic, C, C #, or C++, Fortran, Pascal, Eiffel, Basic, COBOL, etc., or any of a variety of combinations thereof.

The computer-readable medium may be transportable such that the instructions stored thereon can be loaded onto any computer system resource to implement the aspects of the present disclosure discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present disclosure.

Some aspects may be implemented as distributed application components that may be executed on a number of different types of systems coupled over a computer network. Some components may be located and executed on mobile devices, servers, tablets, or other system types. Other components of a distributed system may also be used, such as databases or other component types.

Figure 4:
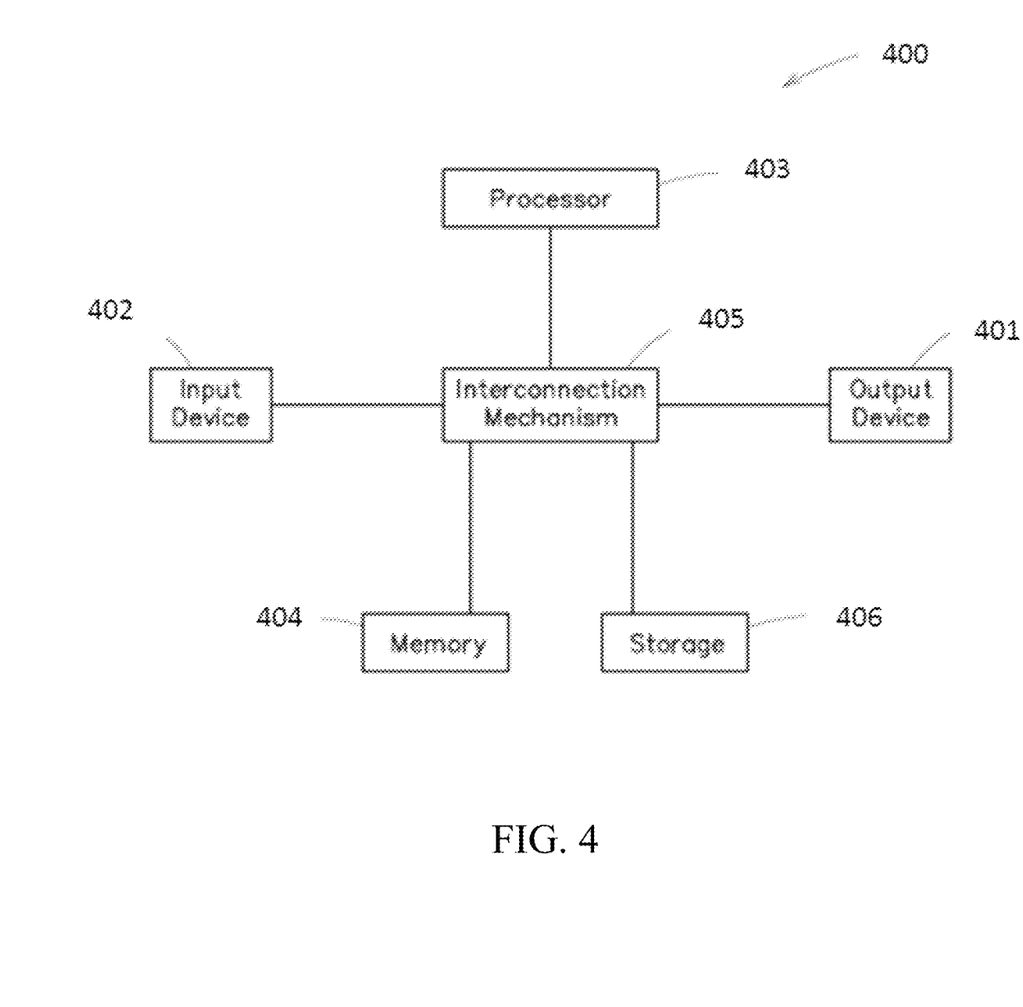
FIG. 4 shows an example computer system with which various aspects of the present disclosure may be practiced.
Figure 5:
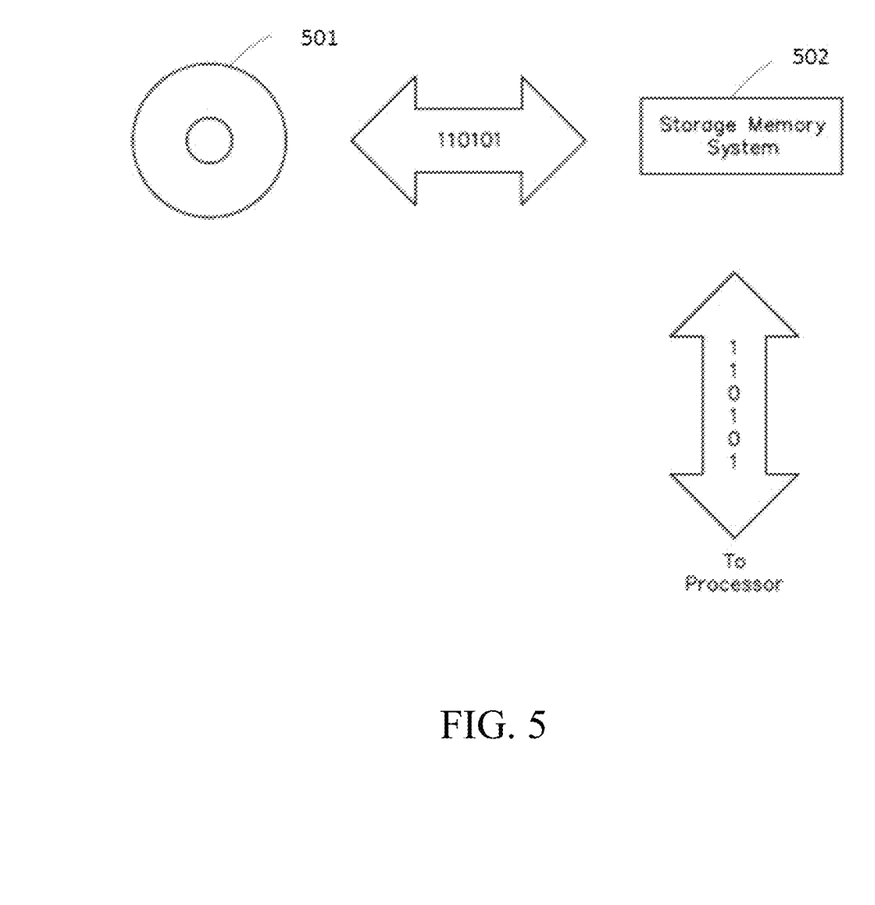
FIG. 5 shows an example storage system capable of implementing various aspects of the present disclosure.

Any number of processes systems of distributed systems may be implemented on a computer system described below in relation to FIGS. 4 and 5. In particular, FIG. 4 shows an example computer system 400 used to implement various aspects. FIG. 5 shows an example storage system 500 that may be used.

System 400 is merely an illustrative embodiment of a computer system suitable for implementing various aspects of the disclosure. Such an illustrative embodiment is not intended to limit the scope of the disclosure, as any of numerous other implementations of the system, for example, are possible and are intended to fall within the scope. For example, a virtual computing platform may be used. None of the claims set forth below are intended to be limited to any particular implementation of the system unless such claim includes a limitation explicitly reciting a particular implementation.

Various embodiments may be implemented on one or more computer systems. These computer systems may be, for example, general-purpose computers such as those based on Intel PENTIUM-type processor, Motorola PowerPC, Sun UltraSPARC, Hewlett-Packard PA-RISC processors, or any other type of processor. It should be appreciated that one or more of any type computer system may be used to partially or fully automate integration of the security services with the other systems and services according to various embodiments. Further, the software design system may be located on a single computer or may be distributed among a plurality of computers attached by a communications network.

For example, various aspects may be implemented as specialized software executing in a general-purpose computer system 400 such as that shown in FIG. 4. The computer system 400 may include a processor 403 connected to one or more memory devices 404, such as a disk drive, memory, or other device for storing data. Memory 404 is typically used for storing programs and data during operation of the computer system 400. Components of computer system 400 may be coupled by an interconnection mechanism 405, which may include one or more busses (e.g., between components that are integrated within a same machine) and/or a network (e.g., between components that reside on separate discrete machines). The interconnection mechanism 405 enables communications (e.g., data, instructions) to be exchanged between system components of system 400. Computer system 400 also includes one or more input devices 402, for example, a keyboard, mouse, trackball, microphone, touch screen, and one or more output devices 401, for example, a printing device, display screen, and/or speaker. In addition, computer system 400 may contain one or more interfaces (not shown) that connect computer system 400 to a communication network (in addition or as an alternative to the interconnection mechanism 405).

The storage system 406, shown in greater detail in FIG. 5, typically includes a computer readable and writeable nonvolatile recording medium 501 in which signals are stored that define a program to be executed by the processor or information stored on or in the medium 501 to be processed by the program. The medium may, for example, be a disk or flash memory. Typically, in operation, the processor causes data to be read from the nonvolatile recording medium 501 into another memory 502 that allows for faster access to the information by the processor than does the medium 501. This memory 502 is typically a volatile, random access memory such as a dynamic random-access memory (DRAM) or static memory (SRAM). It may be located in storage system 506, as shown, or in memory system 504, not shown. The processor 503 generally manipulates the data within the integrated circuit memory 504, 502 and then copies the data to the medium 501 after processing is completed. A variety of mechanisms are known for managing data movement between the medium 501 and the integrated circuit memory element 504, 502, and the disclosure is not limited thereto. The disclosure is not limited to a particular memory system 404 or storage system 406.

In at least one example, the memory 404 and/or the storage system 406 are utilized to store the image data acquired by one or both of the 1-D image sensor 116 and the 2-D image sensor 108 as it is acquired in real-time as well as when it is being stitched together by the processor 403.

The computer system 400 may include specially-programmed, special-purpose hardware, for example, an application-specific integrated circuit (ASIC). Aspects may be implemented in software, hardware or firmware, or any combination thereof. Further, such methods, acts, systems, system elements and components thereof may be implemented as part of the computer system described above or as an independent component.

Although the computer system 400 is shown by way of example as one type of computer system upon which various aspects may be practiced, it should be appreciated that aspects are not limited to being implemented on the computer system as shown in FIG. 4. Various aspects may be practiced on one or more computers having a different architecture or components that that shown in FIG. 4.

Computer system 400 may be a general-purpose computer system that is programmable using a high-level computer programming language. Computer system 400 may be also implemented using specially programmed, special purpose hardware. In computer system 400, processor 403 is typically a commercially available processor such as the well-known Pentium, Core, Core Vpro, Xeon, or Itanium class processors available from the Intel Corporation. Many other processors are available. Such a processor usually executes an operating system which may be, for example, the Windows NT, Windows 2000 (Windows ME), Windows XP, Windows Vista or Windows 7 operating systems available from the Microsoft Corporation, MAC OS Snow Leopard, MAC OS X Lion operating systems available from Apple Computer, the Solaris Operating System available from Sun Microsystems, iOS, Blackberry OS, Windows 7 Mobile or Android OS operating systems, or UNIX available from various sources. Many other operating systems may be used.

The processor and operating system together define a computer platform for which application programs in high-level programming languages are written. It should be understood that the disclosure is not limited to a particular computer system platform, processor, operating system, or network. Also, it should be apparent to those skilled in the art that the present disclosure is not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various aspects may be distributed among one or more computer systems configured to provide a service (e.g., servers) to one or more client computers, or to perform an overall task as part of a distributed system. For example, various aspects may be performed on a client-server system that includes components distributed among one or more server systems that perform various functions according to various embodiments of the disclosure. These components may be executable, intermediate (e.g., IL) or interpreted (e.g., Java) code which communicate over a communication network (e.g., the Internet) using a communication protocol (e.g., TCP/IP).

It should be appreciated that the disclosure is not limited to executing on any particular system or group of systems. Also, it should be appreciated that the disclosure is not limited to any particular distributed architecture, network, or communication protocol.

Various embodiments of the present disclosure may be programmed using an object-oriented programming language, such as SmallTalk, Java, C++, Ada, or C #(C-Sharp). Other object-oriented programming languages may also be used. Alternatively, functional, scripting, and/or logical programming languages may be used. Various aspects may be implemented in a non-programmed environment (e.g., documents created in HTML, XML or other format that, when viewed in a window of a browser program, render aspects of a graphical-user interface (GUI) or perform other functions). Various aspects may be implemented using various Internet technologies such as, for example, the well-known Common Gateway Interface (CGI) script, PHP Hyper-text Preprocessor (PHP), Active Server Pages (ASP), HyperText Markup Language (HTML), Extensible Markup Language (XML), Java, JavaScript, Asynchronous JavaScript and XML (AJAX), Flash, and other programming methods. Further, various aspects of the present disclosure may be implemented in a cloud-based computing platform, such as the well-known EC2 platform available commercially from Amazon.com (Seattle, WA), among others. Various aspects may be implemented as programmed or non-programmed elements, or any combination thereof.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the disclosure. Embodiments disclosed herein may be combined with other embodiments in any manner consistent with at least one of the principles disclosed herein, and references to "an embodiment," "some embodiments," "an alternate embodiment," "certain embodiments," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

Further examples and embodiments disclosed herein are not limited in application to the details of construction and the arrangement of components set forth in the foregoing description or illustrated in the accompanying drawings. Various examples are capable of implementation in other embodiments and of being practiced or of being carried out in various ways. Examples of specific implementations are provided herein for illustrative purposes only and are not intended to be limiting.

Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Accordingly, the foregoing description and drawings are by way of example only.

What is claimed is:

1. An optical imaging apparatus comprising:
   optics configured to provide a first optical channel and a second optical channel through the optics;
   a two-dimensional image sensor optically coupled to the optics, the two-dimensional image sensor configured to receive a first optical signal from the first optical channel and provide a two-dimensional image;
   a one-dimensional image sensor assembly optically coupled to the optics and sharing a same optical path, the one-dimensional image sensor assembly configured to receive a second optical signal from the second optical channel at a one-dimensional image sensor therein to provide an image, the image with an overlapping coverage area in the two-dimensional image;
   at least one processor configured to operate the two-dimensional image sensor and the one-dimensional image sensor assembly; and
   an electromechanically actuated scanning mirror configured to move the image in an elevation direction to provide scans in elevation of the image to the one-dimensional image sensor assembly, the movement of the electromechanically actuated scanning mirror is responsive to receiving a control signal from the at least one processor.

2. The optical imaging apparatus of claim 1, further comprising a gimbal assembly configured to step the two-dimensional image and the image in a horizontal direction through a plurality of steps.

3. The optical imaging apparatus of claim 2, wherein the two-dimensional image sensor and the one-dimensional image sensor are configured to backscan in a horizontal direction for a last step of the plurality of steps.

4. The optical imaging apparatus of claim 1, wherein the two-dimensional image sensor has a first field of view, the one-dimensional image sensor has a second field of view that is an integer multiple N of the first field of view in a horizontal direction.

5. The optical imaging apparatus of claim 4, wherein the at least one processor is configured to move the scanning mirror by a predetermined angle N times in the elevation direction to produce, for each of the N times, the image that overlaps with the coverage area of the two-dimensional Image.

6. The optical imaging apparatus of claim 1, further comprising an image motion compensator configured to stabilize the images provided by the two-dimensional and one-dimensional image sensors.

7. The optical imaging apparatus of claim 1, wherein the two-dimensional image sensor is an electro-optical/infrared camera sensor.

8. The optical imaging apparatus of claim 1, wherein the one-dimensional image sensor is a hyperspectral imaging sensor.

9. The optical imaging apparatus of claim 1, further comprising a beam splitter configured to provide the first optical channel to the two-dimensional image sensor and provide the second optical channel to the one-dimensional image sensor assembly.

10. A method of optical imaging, comprising:
    providing a first optical channel and a second optical channel sharing a same optical path through optics;
    receiving a first optical signal from the first optical channel from a two-dimensional sensor;

providing a two-dimensional image from the first optical signal;

receiving a second optical signal from the second optical channel from a scanned one-dimensional sensor having an overlapping coverage area of the two-dimensional image sensor;

moving the image in an elevation direction to provide scans in elevation of the image using an electromechanically actuated mirror that is responsive to receiving a control signal; and providing an image from the second optical signal provided from the scanned one-dimensional image sensor.

11. The optical imaging method of claim 10, further comprising moving the two-dimensional image and the image in azimuth through a plurality of steps in a horizontal direction.

12. The optical imaging method of claim 11, further comprising backscanning the two-dimensional image and the image in a horizontal direction for a last step of the plurality of steps.

13. The optical imaging method of claim 10, further comprising providing the two-dimensional image sensor with a first field of view and providing the one-dimensional image sensor with a second field of view that is an integer multiple N of the first field of view in a horizontal direction.

14. The optical imaging method of claim 13, further comprising moving the image by a predetermined angle N times in the elevation direction to produce, for each of the N times, the image that overlaps with the coverage area of the two-dimensional image.

15. The optical imaging method of claim 10, further comprising providing the first optical channel with the two-dimensional image sensor and providing the second optical channel with the one-dimensional image sensor.

16. The optical imaging method of claim 10, wherein providing a two-dimensional image from a two-dimensional image sensor includes providing a plurality of two-dimensional images including the two-dimensional image and stitching each of the plurality of two-dimensional images together.

17. The optical imaging method of claim 10, wherein providing the image includes providing a plurality of images, and the method further comprises stitching each of the plurality of images together.

18. The optical imaging method of claim 10, wherein the first optical signal has a first wavelength range and the second optical signal has a second wavelength range that excludes the first wavelength range.

* * * * *